Dec. 14, 1948.  L. A. KEMPTON  2,456,066
MEMBER SEALING MEANS
Filed April 6, 1945
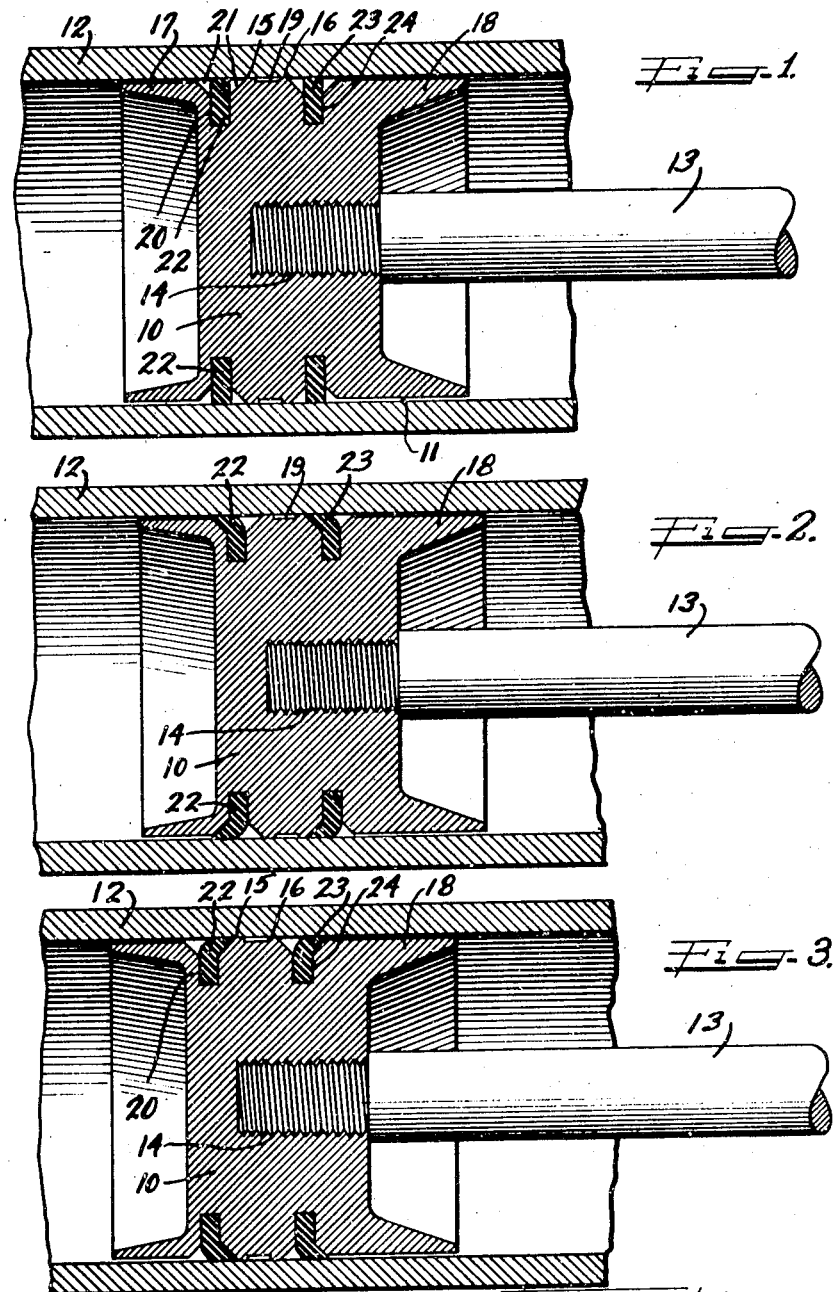
Inventor
LESLIE A. KEMPTON.

Patented Dec. 14, 1948

2,456,066

UNITED STATES PATENT OFFICE 2,456,066

MEMBER SEALING MEANS

Leslie A. Kempton, Chicago, Ill., assignor to The Dole Valve Company, Chicago, Ill., a corporation of Illinois Application April 6, 1945, Serial No. 586,998

8 Claims. (Cl. 309—4)

This invention relates to a sealing means, and more particularly to a seal between reciprocating concentrically disposed parts.

It is well known that seals between reciprocating parts are usually subjected to the deteriorating effect of the fluid as well as to the deteriorating effect of the material of the seal not being properly worked or kept "alive." This is particularly true of seals formed of material such as rubber or the like.

One of the principal features and objects of the present invention is to provide a noval sealing means between two surfaces having relative movement with respect to each other.

Another object of the present invention is to provide a novel seal between reciprocating concentrically disposed members.

A further object of the present invention is to provide a novel bearing seal.

Another and further object of the present invention is to provide a dual seal between two concentrically disposed relatively reciprocating parts, the bearing surface being disposed between the seals.

Still another and further object of the present invention is to provide a novel sealing means which is economical to manufacture and assemble and which is extremely effective and durable in use.

The novel features which I believe to be characteristic of my invention are set forth with particularity in the appended claims. My invention itself, however, both as to its manner of construction and method of operation, together with further objects and advantages thereof, may best be understood by reference to the following description, taken in connection with the accompanying drawing, in which:

Figure 1 is a sectional view of a sealing means embodying the novel teachings of the present invention employed between two relatively reciprocating parts;

Figure 2 is a view similar to that of Figure 1 but showing the position of the sealing means when the piston member is being moved to the right; and Figure 3 is a view similar to Figure 1 but showing the relative position and shape of the sealing means when the piston is being moved to the left.

In order to illustrate the teachings of the present invention I have shown an embodiment in Figures 1 to 3 of the drawing wherein a piston or reciprocating member 10, having an outer cylindrical surface 11, is mounted within a cylinder or tubular member 12. The piston 10 is mounted on an actuating member 13 which is threaded into the piston 10 as at 14. The outer surface of the piston 10 is provided with a pair of bearing lands 15 and 16 which make a close sliding fit with the interior cylindrical surface of the cylinder 12. The piston 10 is also provided with a forward skirt portion 17 and a rearward skirt portion 18 which have outer surfaces concentric but slightly spaced from the interior surface of the cylinder 12. A groove 19 is cut between the bearing lands 15 and 16. This is done for the purpose of reducing friction between the movable piston 10 and the cylinder 12. To the left of the bearing land 15 an annular groove 20 is cut in the piston 10. The base of the groove 20 is flat and for a substantial portion thereof the side walls lie in parallel disposed radial planes. The outer ends of the groove 20, however, are cut away as at 21 for a reason which will presently be apparent.

Disposed within the groove 20 is a resilient sealing ring 22 of rectangular cross-section. This sealing ring 22 may be formed of any suitable material such, for example, as rubber or Neoprene. The sealing ring 20 is of such cross-sectional dimension that it seats tightly and snugly within the lower portion of the groove 20 and extends up into tight sealing engagement with the cylindrical inner surface of the cylinder 12.

A similar resilient sealing ring 23 is provided to the right of the bearing land 16 and is disposed in a groove 24.

As the piston 10 is reciprocated back and forth within the cylinder 12, the radial outer portions of the sealing rings 22 and 23 are flexed back and forth, as is clearly shown in Figures 2 and 3 of the drawing. The flared outer portions of the grooves 20 and 24 enable this flexing back and forth of the radial outer portions of the sealing rings. It will thus be understood that as the piston 10 moves to the right the sealing rings 22 and 23 remain in a fixed position with respect to the cylinder 12 until the left-hand flared side wall of each groove lies thereagainst. From that point on the sealing rings 22 and 23 slide with respect to the cylinder 12. The action of the sealing rings thus is one in which there is first a flexing or working of the rubber, followed by a sliding of the sealing ring with respect to the cylinder. It has been found that this action greatly prolongs the life of the sealing rings due to the kneading or working of the material forming the rings. It has further been found that by providing a sealing means of this character on each side of the bearing land, that the sealing means acts as a seal to prevent the flow of fluid from one side of the piston to the other; protects the bearing; provides a minimum of friction, and prevents accumulation of deposits around the bearing land.

By reducing the diameter of the skirt portions 17 and 18 so that they are slightly spaced from the inner surface of the cylinder 12, the friction between the relatively moving parts is held to a minimum.

Since the radial inner portion of the sealing ring of the present invention is rigidly held, there is no possibility of the ring turning inside out as is the case with a sealing ring and construction of the so-called "O-ring" type. Thus any harmful effects of overworking the material forming the sealing ring is eliminated, and yet at the same time the material is worked to moderate extent by the outer portion of the ring flapping over through a limited angle as the reciprocating parts reverse their relative direction of motion. The angle subtended by the flaring outer wall portions of the groove should preferably be in the neighborhood of 90°. If the angle is much greater the seal becomes ineffective and not enough support is given the outer portion of the sealing ring. If the angle is much less, the material of the sealing ring is usually not worked sufficiently to keep it alive.

While I have shown a particular embodiment of my invention, it will, of course, be understood that I do not wish to be limited thereto, since many modifications may be made, and I, therefore, contemplate by the appended claims to cover all such modifications as may fall within the true spirit and scope of my invention.

I claim as my invention:

1. The combination comprising a member having a bore, a piston member mounted for relative movement within said bore, said piston member having a bearing land making a close sliding fit with said bore, said piston member also having radially outwardly opening grooves between the bearing land and the end of said piston, a resilient packing element disposed in each of said grooves and extending into slightly compressed engagement with said bore, the inner wall portions of each of said grooves firmly gripping said element while the outer wall portions are flared away from their associated elements.

2. The combination comprising a cylinder, a piston mounted for reciprocating movement within said cylinder, said piston having an outer surface slightly spaced from said cylinder, a pair of bearing lands on an intermediate portion of said piston making a close sliding fit with said cylinder, said piston having a groove between each land and the nearest end of said piston, a resilient packing element disposed in each of said grooves and extending into slightly compressed engagement with said cylinder, inner wall portions of each of said grooves firmly gripping its associated element while the outer wall portions are flared away therefrom.

3. In combination relatively slidable members, one of which has a land surface in frictional engagement with the other and a sealing element interposed between and in stressed sealing engagement with said members between the said land and the end of the member, said element having a flexible free portion tightly pressed against one of said members adjacent said land and one of said members being recessed around said free portion providing clearance for the bending of said free portion laterally with respect to said land during a limited extent of relative sliding movement of said members without dislodging said free portion from its position of sealing engagement.

4. In combination relatively slidable members one of which has a land surface in frictional engagement with the other and a sealing element interposed between and in stressed sealing engagement with said members adjacent said land, said element having a flexible free portion tightly pressed against one of said members adjacent said land and one of said members being recessed around said free portion providing clearance for the bending of said free portion laterally with respect to said land during a limited extent of relative sliding movement of said members without dislodging said free portion from its position of sealing engagement, said free portion upon continued relative movement of said members being movable against the recessed member so as to bottom thereon and thereafter have sliding sealing contact with one of said members.

5. In combination a cylinder, a piston mounted for reciprocating movement within said cylinder, said piston having a plurality of bearing lands making a sliding fit with said cylinder, and flexible packing elements disposed in said piston in compressed engagement with said cylinder between the bearing lands and each end of the piston.

6. In combination a cylinder, a piston mounted for reciprocating movement within said cylinder, said piston having a plurality of bearing lands making a close sliding fit with said cylinder, flexible packing element disposed in said piston in compressed engagement with said cylinder between the bearing lands and each end of the piston and support means on either side of said flexible packing element against which the element abuts when flexed.

7. The combination comprising a cylinder, a piston mounted for reciprocating movement within said cylinder, said piston having outer cylindrical skirt portions at either end thereof slightly spaced from said cylinder, a pair of bearing lands on an intermediate portion of said piston making a close sliding fit with said cylinder, said piston having a groove between said lands and the ends of said piston, a resilient packing element disposed in each of said grooves and extending into slightly compressed engagement with said cylinder, inner wall portions of each of said grooves firmly gripping its associated element while the outer wall portions are flared away therefrom, the pressure of the resilient packing element against the cylinder wall causing it to rock over against the flared portion of said groove without breaking the sealing engagement when said piston is moved in said cylinder.

8. The combination comprising a cylinder, a piston mounted for reciprocating movement within said cylinder, said piston having outer cylindrical skirt portions at either end thereof, a pair of bearing lands on an intermediate portion of said piston making a close sliding fit with said cylinder, said piston having a groove between each land and the nearest end of said piston, a resilient packing element disposed in each of said grooves and extending into slightly compressed engagement with said cylinder, inner wall portions of each of said grooves firmly gripping its associated element while the outer wall portions are flared away therefrom, each flared wall portion being associated with either a skirt portion or a land portion to afford support means for said resilient packing element after it has been flexed.

LESLIE A. KEMPTON.

REFERENCES CITED

The following references are of record in the file of this patent:

UNITED STATES PATENTS

| Number | Name | Date |
|---|---|---|
| 348,998 | Place | Sept. 14, 1886 |
| 866,443 | Dyer | Sept. 17, 1907 |
| 1,330,188 | Johnston | Feb. 10, 1920 |
| 1,434,591 | Copp | Nov. 7, 1922 |
| 2,018,205 | Evans | Oct. 22, 1935 |
| 2,019,757 | Loweke | Nov. 5, 1935 |
| 2,336,250 | Hein | Dec. 7, 1943 |
| 2,360,731 | Smith | Oct. 17, 1944 |
| 2,368,744 | Cary | Feb. 6, 1945 |